United States Patent
Gao et al.

(10) Patent No.: US 6,207,609 B1
(45) Date of Patent: Mar. 27, 2001

(54) METHOD OF FORMING MOLYBDENUM CARBIDE CATALYST

(75) Inventors: Lin Gao, Piscataway; Purnesh Seegopaul, Flemington, both of NJ (US)

(73) Assignee: N.V. Union Miniere S.A., Brussels (BE)

( * ) Notice: Subject to any disclaimer, the term of this patent is extended or adjusted under 35 U.S.C. 154(b) by 0 days.

(21) Appl. No.: 09/412,175

(22) Filed: Sep. 30, 1999

(51) Int. Cl.$^7$ ...................................... B01J 27/22
(52) U.S. Cl. ................... 502/177; 502/182; 501/87; 423/345; 423/414; 423/439; 423/440
(58) Field of Search ................... 502/177, 182; 501/87; 423/345, 414, 439, 440

(56) References Cited

U.S. PATENT DOCUMENTS

| | | | |
|---|---|---|---|
| 3,897,542 | * | 7/1975 | Economy et al. ................... 423/440 |
| 4,522,708 | * | 6/1985 | Leclercq et al. ..................... 208/136 |
| 4,851,206 | * | 7/1989 | Boudart et al. ...................... 423/409 |
| 5,139,987 | * | 8/1992 | Ledoux et al. ....................... 502/177 |
| 5,308,597 | * | 5/1994 | Ledoux et al. ....................... 423/440 |
| 5,427,761 | * | 6/1995 | Grindatto et al. ................... 423/440 |
| 5,795,837 | * | 8/1998 | Wei et al. ............................... 501/87 |

* cited by examiner

*Primary Examiner*—Mark L. Bell
*Assistant Examiner*—Patricia L. Hailey
(74) *Attorney, Agent, or Firm*—Wood, Herron & Evans LLP

(57) ABSTRACT

A molybdenum carbide compound is formed by reacting a molybdate with a mixture of hydrogen and carbon monoxide. By heating the molybdate powder from a temperature below 300° C. to maximum temperature 850° C., a controlled reaction can be conducted wherein molybdenum carbide is formed. A high surface area, nanograin, metastable molybdenum carbide can be formed when the reaction temperature is below 750° C. The metastable molybdenum carbide is particularly suitable for use as a catalyst for the methane dry reforming reaction.

7 Claims, No Drawings

METHOD OF FORMING MOLYBDENUM CARBIDE CATALYST

BACKGROUND OF THE INVENTION

Synthesis gas is a mixture of hydrogen and carbon monoxide, which is formed from methane reforming and has a variety of different applications in organic reactions. This can be formed by combining steam and oxygen with methane at high temperatures. Another method of forming synthesis gas from methane is the methane dry reforming reaction. In this reaction, carbon dioxide is mixed with methane and the blend is subjected to high temperature in the presence of a catalyst. This in turn forms hydrogen and carbon monoxide. The hydrogen from the reforming process is particularly suitable for use in fuel cell power systems.

The typical catalyst for use in the methane dry reforming reaction is a noble metal such as gold, platinum or the like. However, these catalysts tend to be relatively expensive. Molybdenum carbide is known as a catalyst for such reaction. However, this can be difficult to form. Further for use as a catalyst, high surface area is critical. Molybdenum carbide tends to form larger grains having reduced surface areas which in turn reduces its effectiveness as a catalyst. Thus, because of this problem and the high temperature and time required to form molybdenum carbide, it has not been used commercially as a catalyst for the methane dry reforming reaction.

SUMMARY OF THE INVENTION

The present invention is premised on the realization that a molybdenum carbide catalyst suitable for use in the methane dry reforming reaction as well as other reactions can be formed at relatively low temperatures and in relatively short periods of time. These reactions also include fuel processing as applicable in fuel cell uses.

More particularly the present invention is premised on the realization that molybdates such as ammonium molybdate can be directly formed into a high surface area molybdenum carbide by direct reaction with a mixture of hydrogen and carbon monoxide. The molybdate is heated from a temperature below 300° C. to a temperature below 850° C. at a ramp rate of about 2–20° C./min in the presence of the hydrogen, carbon monoxide mixture. This permits the molybdate to be reduced and then carburized directly to molybdenum carbide.

The formed molybdenum carbide has a high surface area in the range of 35–100 m²/g and has a metastable $Mo_2C$ structure with very diffused X-ray diffraction peaks. The carbide powder can be used as a catalyst in the methane dry reforming reaction to obtain nearly theoretical yields of hydrogen and carbon monoxide at a temperature of 850° C.

DETAILED DESCRIPTION

According to the present invention, a molybdenum carbide powder is formed from a molybdate by reacting it under 750° C. with a mixture of a reducing and carburizing gases, which are specifically hydrogen and carbon monoxide. The formed carbide has a structure of $Mo_2C_y$, wherein y represents 0.95 to 1.05.

The starting molybdate can be any molybdate wherein the counter ion is not a metal. Generally, the counter ion will be an organic compound or ammonium which is preferred due to its availability. Other molybdenum compounds such as molybdenum oxides can also be used.

The reaction gas would be a blend of hydrogen and carbon monoxide at a ratio between 3:1 to 1:1 and preferably at 1:1 ratio (by volume). Other carburizing gases such as methane or ethylene can also be used.

The reaction can be conducted in any suitable furnace which permits control of the gaseous atmosphere and temperature. A rotary kiln is particularly suitable due to its ability to ensure adequate mixing of the solid and gaseous reactants. The ammonium molybdate powder is simply loaded into a quartz liner and placed into the rotary kiln.

The system is purged with nitrogen first and then the hydrogen, carbon monoxide mixture is introduced. The temperature can be quickly raised to 300° C. and thereafter the temperature ramp rate should not exceed 20° C./min and preferably is 2–20° C./min. The reaction temperature and the furnace temperature ramp rate are critical for practicing the present invention. The molybdate starts decomposition at about 300° C. It decomposes into oxides, which at some stage can be amorphous. The reduction and carburization of the resulting oxide occurs at the same time when the temperature goes above 400° C. A 3- to 5-hour soak at a temperature between 550° to 600° C. provides enough time for molybdenum carbide to nucleate and a higher temperature will expedite the formation of molybdenum carbide.

The maximum temperature should not exceed 850° C. and most preferably be less than 750° C. At 700° C., the reaction can be completed in 2 to 4 hours. The reaction time can be shortened by increasing the reaction temperature at the expense of increasing grain size and reducing surface area.

During the reaction, the feeding gas composition can be changed if desired in order to adjust the total carbon content of the powder. Subsequently, the reactor is cooled down with flowing hydrogen, carbon monoxide mixture, hydrogen alone, or nitrogen. Because of the high surface area, the powder should be passivated with diluted oxygen or air after the powder cools down to room temperature.

The molybdenum carbide formed in this manner is a metastable $Mo_2C_y$. X-ray diffraction on the carbide powder shows some missing peaks in the diffraction pattern. At this stage, the powder samples exhibit specific surface areas of over 35 m²/g. Catalysis tests on the carbide powder for the methane dry reforming reaction indicate that the defect $Mo_2C_y$ crystal structure may be responsible for the high catalysis activity of the powder.

The invention will be further appreciated in light of the following detailed examples.

EXAMPLE 1

1.0 lb of ammonium molybdate powder was loaded in a rotary kiln and heated to 590° C. and then 760° C. at a ramp rate of about 10° C./min in a gaseous mixture of $H_2$ and CO at 1:1 volume ratio. The soak time is 5 hours at 590° C. and 3 hours at 760° C. After the furnace cooled down to room temperature, the powder was passivated with a dilute air for about 1 hour. XRD on the product powder shows $Mo_2C$. The BET specific surface area of the powder was 18.5 m²/g. Carbon analysis on the powder showed 5.84% combined carbon and 1.72% free carbon.

EXAMPLE 2

1.0 lb of ammonium molybdate powder was loaded in a rotary kiln and heated to 590° C. and then 700° C. at a ramp rate of about 10° C./min in a gaseous mixture of $H_2$ and CO at 1:1 volume ratio. The soak time is 5 hours at 590° C. and 3 hours at 700° C. After the furnace cooled down to room temperature, the powder was passivated with a dilute air for about 1 hour. XRD on the product powder shows defect $Mo_2C$ with some missing peaks in the XRD pattern. The BET specific surface area of the powder was 37.7 $m^2/g$. Carbon analysis on the powder showed 6.07% combined carbon and 1.62% free carbon.

EXAMPLE 3

1.0 lb of ammonium molybdate powder was loaded in a rotary kiln and heated to 700° C. at a ramp rate of about 10° C./min in a gaseous mixture of $H_2$ and CO at 1:1 volume ratio. The soak time is 5 hours at 700° C. After the furnace cooled down to room temperature, the powder was passivated with a dilute air for about 1 hour. XRD on the product powder shows defect $Mo_2C$ with some missing peaks in the XRD pattern. The BET specific surface area of the powder was 35.7 $m^2/g$. Carbon analysis on the powder showed 5.99% combined carbon and 2.15% free carbon.

EXAMPLE 4

1.6 lb of ammonium molybdate powder was loaded in a production tube furnace and heated to 1080° F. (582° C.) and then 1290° F. (699° C.) at a ramp rate of about 8° C./min in a gaseous mixture of $H_2$ and CO at 3:1 volume ratio. The soak time is 10 hours at 1080° F. and 3 hours at 1290° F. After 3 hours carburization at 1290° F., additional 16% $CO_2$ was introduced for free carbon removal. The decarburization was performed for another 3 hours. After the furnace cooled down in $N_2$ to room temperature, the powder was passivated with a dilute air. XRD on the product powder showed $Mo_2C$ and a XRD peak broadening technique gave a $Mo_2C$ grain size of 26 nm. The BET specific surface area of the powder was 39 $m^2/g$. Carbon analysis on the powder showed 5.53% combined carbon and <0.04% free carbon.

EXAMPLE 5

A methane dry reforming catalyst test was done on the metastable $Mo_2C$ powder synthesized as shown in example 2. The test was performed in a small tube furnace. Two quartz wool plugs were used to keep 5 g $Mo_2C$ powder layer in between and permit the reacting gases passing through. Mass flow meters were used to control the gas flow and a 3-channel ($CH_4$/CO/$CO_2$) IR analyzer was used to monitor the inlet and outlet gas compositions. The test showed 47% CO yield initially, which is very close to the equilibrium 49% CO yield. This high CO yield was kept for over 48 hours. Then, the yield dropped to and stabilized at about 25% for another 24 hours. The test was interrupted after 72 hours. Catalytic activity was still obvious, even after 72 hours of reaction.

This has been a description of the present invention along with the preferred method of practicing the present invention. However, the invention itself should only be defined by the appended claims wherein we claim:

What is claimed is:

1. A method of forming a $Mo_2C_y$ compound wherein $y$ is 0.95 to 1.05 comprising heating a molybdate to a temperature of 300° C. and then from 300° C. to less than 850° C. at a ramp rate of 2 to 20° C./min in a gaseous blend of a reducing gas and a carburizing gas for a time effective to convert said molybdate to $Mo_2C_y$.

2. The method claimed in claim 1 wherein said gaseous blend is selected from the group consisting of a mixture of hydrogen and carbon monoxide, and a mixture of hydrogen, carbon monoxide and carbon dioxide.

3. The method claimed in claim 1 wherein said gaseous blend is a mixture of hydrogen and carbon monoxide having a volume ratio of 3:1 to 1:1.

4. The method claimed in claim 1 wherein said molybdate is heated to a temperature from 300° C. to 750° C.

5. The method claimed in claim 1 wherein said carburizing gas is selected from the group consisting of carbon monoxide, carbon dioxide, methane, ethylene and mixtures thereof.

6. The method claimed in claim 1 further comprising passivating said formed $Mo_2C_y$ with diluted oxygen.

7. The method claimed in claim 1 comprising soaking said molybdate in a gaseous mixture of hydrogen and carbon monoxide at a temperature of 550 to 600° C. for 2 to 5 hours.

\* \* \* \* \*